United States Patent [19]

Goodlander et al.

[11] Patent Number: 5,257,367
[45] Date of Patent: Oct. 26, 1993

[54] DATA STORAGE SYSTEM WITH ASYNCHRONOUS HOST OPERATING SYSTEM COMMUNICATION LINK

[75] Inventors: Theodore J. Goodlander; Raul Kacirek, both of Nashau, N.H.; Andras Sarkozy, Milton, Mass.; Tamas Hetenyi; Janos Selmeczi, both of Concord, Mass.

[73] Assignee: Cab-Tek, Inc., Nashua, N.H.

[21] Appl. No.: 554,127

[22] Filed: Jul. 17, 1990

Related U.S. Application Data

[63] Continuation-in-part of Ser. No. 317,048, Feb. 27, 1989, Pat. No. 4,942,579, which is a continuation of Ser. No. 57,346, Jun. 2, 1987, abandoned.

[51] Int. Cl.$^5$ .............................................. G06F 13/12
[52] U.S. Cl. ................................. 395/600; 364/236.2; 364/238.4; 364/242.3; 364/243; 364/248.1; 364/256.3; 364/282.1; 364/DIG. 1
[58] Field of Search ................ 395/600, 600 MS File

[56] References Cited

U.S. PATENT DOCUMENTS

| | | | |
|---|---|---|---|
| 3,876,978 | 4/1975 | Bossen et al. | 340/146.1 |
| 4,228,496 | 10/1980 | Katzman et al. | 364/200 |
| 4,410,942 | 10/1983 | Milligan et al. | 364/200 |
| 4,467,421 | 8/1984 | White | 364/200 |
| 4,644,545 | 2/1987 | Gershenson | 371/38 |
| 4,722,085 | 1/1988 | Flora et al. | 364/200 |
| 4,761,785 | 8/1988 | Clark et al. | 371/51 |
| 4,849,978 | 7/1989 | Dishon et al. | 371/51 |
| 4,903,218 | 2/1990 | Longo et al. | 364/521 |
| 4,933,936 | 6/1990 | Rasmussen et al. | 370/85.9 |

FOREIGN PATENT DOCUMENTS

| | | |
|---|---|---|
| 0156724 | 10/1985 | European Pat. Off. |
| 0201330 | 11/1986 | European Pat. Off. |
| 1578485 | 11/1980 | United Kingdom |

OTHER PUBLICATIONS

Synchronized Disk Interleaving, Michelle Y. Kim, IEEE Transactions on Computers, vol. C-35, No. 11, Nov. 1986.
MCU Architecture Facilitates Disk Controller Design, P. La Violetter et al, Wescon Proceedings, San Francisco, Nov. 19th-22nd, 1985, vol. 29, pp. 1-9, New York, US.
A Case for Redundant Arrays of Inexpensive Disks (RAID) by David A. Patterson, Garth Gibson, and Randy H. Katz, Report No. UCB/CSD 87/391, Dec. 1987, Computer Science Division (EECS) University of California, Berkeley, Calif. 94720 26 pgs.

*Primary Examiner*—Gareth D. Shaw
*Assistant Examiner*—John Q. Chavis
*Attorney, Agent, or Firm*—Davis, Bujold & Streck

[57] ABSTRACT

This invention provides disk drive access control apparatus for connection between a host computer and a plurality of disk drives to provide an asynchronously operating storage system. It also provides increases in performance over earlier versions thereof. There are a plurality of disk drive controller channels connected to respective ones of the disk drives and controlling transfers of data to and from the disk drives, each of the disk drive controller channels includes a cache/buffer memory and a micro-processor unit. An interface and driver unit interfaces with the host computer and there is a central cache memory. Cache memory control logic controls transfers of data from the cache/buffer memory of the plurality of disk drive controller channels to the cache memory and from the cache memory to the cache/buffer memory of the plurality of disk drive controller channels and from the cache memory to the host computer through the interface and driver unit. A central processing unit manages the use of the cache memory by requesting data transfers only of data not presently in the cache memory and by sending high level commands to the disk drive controller channels. A first (data) bus interconnects the plurality of disk drive cache/buffer memories, the interface and driver unit, and the cache memory for the transfer of information therebetween and a second (information and commands) bus interconnects the same elements with the central processing unit for the transfer of control and information therebetween.

29 Claims, 6 Drawing Sheets

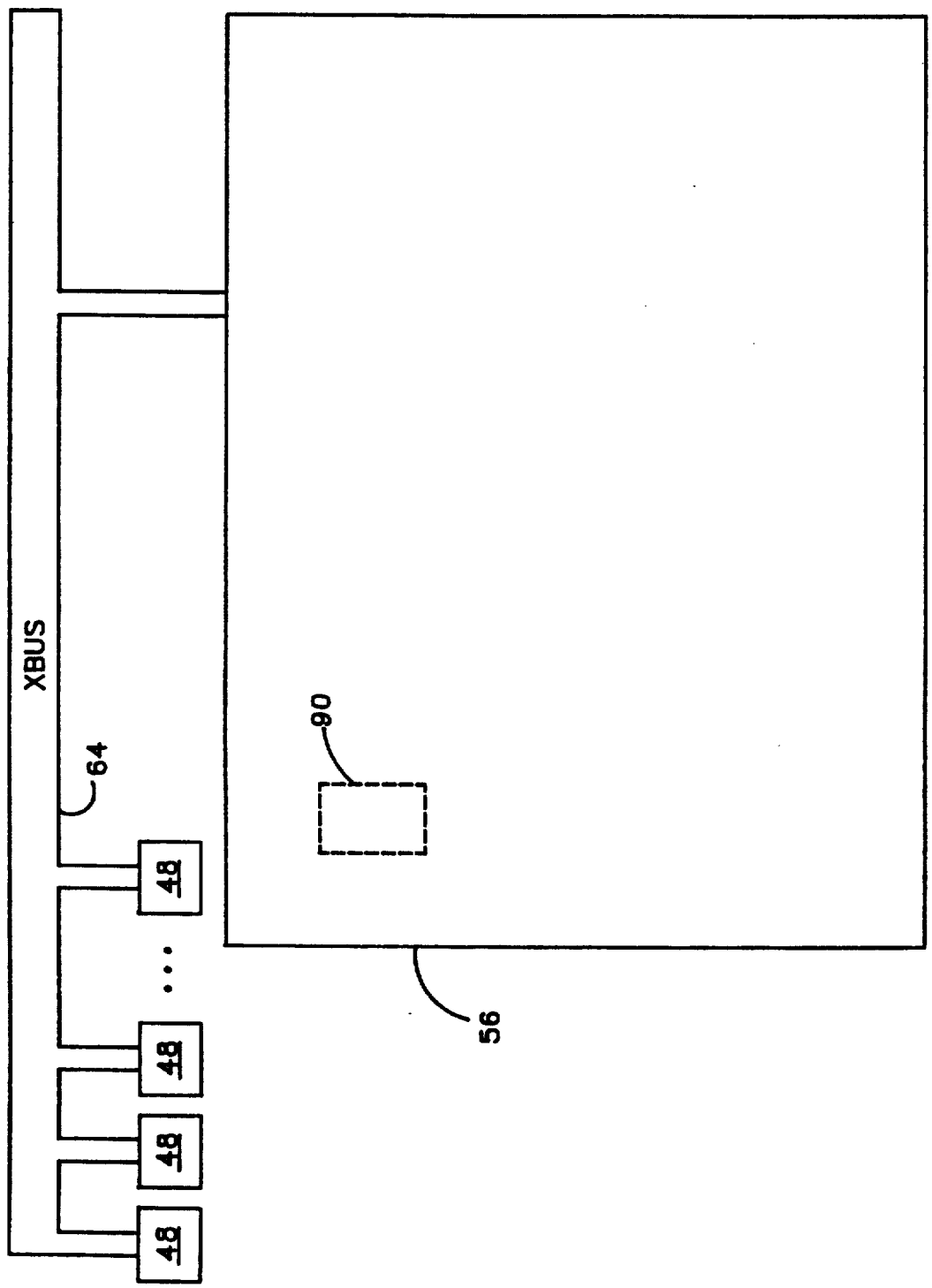

DATA STORAGE SYSTEM WITH ASYNCHRONOUS HOST OPERATING SYSTEM COMMUNICATION LINK

This is a continuation-in-part of application Ser. No. 317,048, filed 27 Feb. 1989, issued 17 Jul. 1990 as U.S. Pat. No. 4,942,579 which is a continuation of application Ser. No. 057,346 filed 2 Jun. 1987, now abandoned, the content of which is hereby incorporated by reference.

BACKGROUND OF THE INVENTION

The application relates to memory storage systems for digital computers and, more particularly, to disk drive access control apparatus for connection between a host computer and a plurality of disk drives to provide an asynchronously operating, high-speed, high-capacity, fault-tolerant, error-correcting storage system to receive read and write requests from the host computer, read and write data from and to the plurality of disk drives, and transfer data to and from the host computer, comprising, a plurality of disk drive controller channels connected to respective ones of the plurality of disk drives and controlling transfers of data to and from an associated one of the plurality of disk drives in response to received high level commands, each of the plurality of disk drive controller channels including a cache/buffer memory and a micro-processor unit for controlling the transfers of data; an interface and driver unit interfacing with the host computer; a central cache memory; cache memory control logic controlling transfers of data from the cache/buffer memory of the plurality of disk drive controller channels to the cache memory and from the cache memory to the cache/buffer memory of the plurality of disk drive controller channels and from the cache memory to the host computer through the interface and driver unit; a central processing unit managing the use of the cache memory by requesting data transfers only with respect to ones of the plurality of disk drives where data associated therewith is not presently in the cache memory and by sending high level commands to the plurality of disk drive controller channels to effect data transfers thereby; a first (data) bus interconnecting the plurality of disk drive controller cache/buffer memories, the interface and driver unit, and the cache memory for the transfer of information therebetween; and, a second (information and commands) bus interconnecting the plurality of disk drive controller channels, the interface and driver unit, the cache memory control logic, and the central processing unit for the transfer of control and information therebetween.

As systems employing digital computers have evolved, so have their requirements for storage systems associated therewith. Early computer systems typically had a drum or disk storage device for rapid access to required files which could not be maintained in the random-access main memory. If large quantities of data were being processed that could not fit on the drum or disk, the data were stored on removable magnetic tapes reels that could be mounted (upon request from the computer program) on a tape transport mechanism and read into the computer. Such systems were an improvement over non-computer approaches for applications requiring only occasional access to individual files such as in banking, bookkeeping, payroll, insurance, and similar undertakings. As many applications became more computationally intensive and systems became more complex, the limitations and requirements of the storage systems needed to change. In most instances, however, storage technology has not kept up with the needs of the computer systems. In the original digital computers, a program and its data was loaded, executed, and printed out the answers. The programs involved were straight forward and relatively easy to program. If a program contained an error (i.e. a "bug"), it simply failed to produce an executable program when compiled or assembled and failed to produce an answer when ultimately executed. In a computer system where multiple computers are linked together and run multiple programs on multiple priority levels under the control of an interrupt structure, the problem is not so easy. A program improperly programmed in so-called "re-entrant" coding may run for days or even weeks before the right set of circumstances cause an error. Not only that, such systems are designed to run continuously and only produce results in response to some external stimulus. A bug in such a system may actually be fatal to the system and cause the entire computer to stop executing its programs. If the system in question is an air traffic control system, for example, the term "fatal" bug could be true both literally and figuratively.

If there is a problem with the disk drive system, it should be transparent to the users and the disk drive system should continue to operate despite errors. Moreover, it should correct the errors so as to provide reconstructed, error-free data. Likewise, if the disk drive system is unable to contain all the data files, the required data should be retrieved automatically from a near line archival storage system in as short a time as possible. Preferably, the various functions should be under the control of an artificial intelligence type of system so that needs of the users can be learned and anticipated so as to optimize the system's performance capabilities.

A given system's overall performance capability is the result of the integration of a number of independent technologies whose individual growth in performance/capability over time differs markedly from each other. FIG. 1(a) to (g) shows the historical performance of computer systems' underlying technologies. FIG. 1a shows the exponential growth in semiconductor component performance. The factors behind this are well known and include advances in process technology that increase circuit density and speed. Shrinking geometries and increased wafer yields combined with circuit design innovations mean semiconductor performance should continue its exponential growth. FIG. 1b reflects the exponential growth in CPU hardware performance as measured in MIPS. CPU's are the direct beneficiaries of semiconductors as well as circuit design improvements and architectural innovations such as massively parallel CPU's. FIG. 1c shows the trend in performance for operating systems. OS performance is being flattened by several factors such as the additions of user interfaces, graphics support, and the sheer growth in size over the years, which has made OS's one of the most voracious consumers of computer resources. FIG. id shows the capacity/performance improvements of disk drives. This curve could be best described as "leap-linear." Disk drive device performance and capacities tend to grow linearly until a new technological event occurs. Such events in the past have been the introduction of sealed disk Winchester technology in the early 70s, the introduction of thin film heads and plated media in the 80s, and, in the 90s, the general introduction of 5400 and 7200 RPM drives to cut latency delays and contact recording technology that may push track densities to 100,000 per inch. FIG. 1e demonstrates the performance of I/O systems. This curve represents the composite effect of CPU and controller hardware, operating systems, and disk drives. It should be noted that the exponential growth in semiconductor performance has not been reflected in I/O system performance, which has seen near linear growth. FIG. 1f reflects a commonly understood phenomena with applications programs that, over time, additions, changes, and maintenance to the program tend to lead to a decrease in its performance. FIG. 1g demonstrates that, over all systems performance has showed continued improvement, but at a much slower rate than its underlying technologies In fact, without hardware upgrades and improvements over all system performance declines in response to the performance of operating systems and application programs.

FIG. 1(i) shows a typical prior art computer system employing disk drives for storage. The host computer 10 (i.e. the one interfacing with the computer operators) includes an operating system 12. As known to those skilled in the art, the operating system is a set of computer programs that run continuously while the computer has its power on. The operating system controls all the functions of the computer including requests for operating portions of the memory, error response, and input/output (I/O) requests. The computer 10 has a disk controller 14 connected thereto and the disk controller 14, in turn, is connected to four disk drives 16. In use, an applications program (not shown) makes a request for data from the operating system 12. The location of the data is completely transparent to the applications program; that is, the applications program has no idea where the data is physically located. At system setup time (or possibly subsequently through operator input), the locations of the data is stored in tables (not shown) which are part of or accessible by the operating system 12. Knowing from the tables that the requested data is on a particular disk drive 16 at a particular track between starting and ending sectors, the operating system 12 outputs a disk read request on line 18 to the disk controller 14. The disk controller 14, in turn, then issues a read request to the appropriate disk drive 16 on its connecting line 20 which causes the read head (not shown) within the disk drive 16 to move to the designated track and then read data and output it to the disk controller 14 on the line 20 from the starting sector to the ending sector. When the data has been received by the disk controller 14 (into an appropriate cache/buffer memory, the operating system 12 is informed by an appropriate signal on line 18.

As can be appreciated, if one wants the operating system 12 to do more, the programming of the operating system 12 must get more complex. Given the present state of complexity of the typical operating system and the capabilities of the average systems, computer programmer with respect to such esoteric matters as re-entrant coding and "run anywhere" coding, to ask the operating system to do more is to ask for trouble because of information handling bottle necks.

There is also the problem of system overhead. If you ask the operating system to do more, it will add to the overhead of the operating system and, therefore, to the overhead of every program which accesses it.

For any given OS and computer system, implementation of any real time function will cause the OS to consume a large portion of the computing resource, rapidly degrade the performance of the system from the user's perspective, and severely limit the work product computing potential.

As those skilled in the art will also readily recognize and appreciate, even if the penalty of added overhead is made to the operating system so as to achieve the convenience in other areas, such an approach includes no means of ever reducing the added overhead.

File Maintenance, Management, and Archival Copy (FMMAC) are tasks essential to the reliability, useability, and integrity of computer stored data. These tasks are now performed by Operating Systems functions, separately run applications programs, operator or system manager manual intervention, or a combination of these techniques.

These FMMAC tasks almost always require a manual operator decision to initiate and complete. Often they require the computer system to be taken offline and therefore not available to users during the time it takes to complete these tasks. Some larger, sophisticated Operating Systems allow a designated File to be taken offline leaving most of the computer resource available. However, manual intervention is still required to initiate file maintenance and archival copy.

Because these crucial FMMAC tasks rely on manual intervention, arbitrary circumstances and schedules, the predictability of these tasks being performed is low. This is especially true outside of centralized "Mainframe" Computer centers (FMMAC tasks are typically performed here by a dedicated maintenance shift at great additional operating expense). However, most computers (and by extension, most computer stored data) are not located inside "computer centers" or have the benefit of dedicated file maintenance staffs. Therefore the reliability, usability, and integrity of most computer stored data now rests on human nature and motivation and the dubious assumption that the circumstances surrounding the computer system itself are immune from intervening events such as device failures or rush jobs that take priority over FMMAC tasks.

Continuous duty computer systems such as Real Time monitoring and control systems or Online Transaction Processing systems present additional barriers to FMMAC tasks. In theory, no time is available to perform the tasks. In reality, such systems or files are simply shut off for FMMAC. In "Critical Mission" applications (for example Nuclear Power Plant Monitoring and Control) the FMMAC problem is often abated by duplicating hardware systems at great economic cost.

In the above-referenced parent application of which this is a continuation-in-part, a high-speed, high-capacity, fault-tolerant, error-correcting storage system was disclosed which provides a solution for many of the above-described needs of modern computer systems (both military and commercial). Since its original filing which contained the best mode as contemplated at that time, continued work has developed new embodiments which include novel improvements over the teachings contained therein. In particular, the performance and capacity potential has been significantly increased as has its flexibility as a system component. Moreover, additional improvements to the overall storage system have been incorporated therein.

Wherefore, it is an object of this application to provide significant and patentably distinct improvements to the high-speed, high-capacity, fault-tolerant, error-correcting storage system of the above-referenced parent application of which this is a continuation-in-part.

It is another object of this application to provide significant and patentably distinct improvements to high-speed, high-capacity, storage systems for digital computers in general.

It is yet another object of this present invention to provide a means to maintain, manage, and archive copy files on an automatic and User transparent basis and to provide high predictability for the reliability, usability, and integrity of computer stored data.

Computer stored Files are generally classified by their application use such as "payroll files" or "inventory files" much in the same way that a typical office filing cabinet and the folders inside would be labeled. Those skilled in the art will recognize that files can also be classified by their usage in time. That is to say that some files are used more often than others and can be reliably classified on that basis:

| CLASSIFICATION | USAGE IN TIME |
| --- | --- |
| Continuous: | A file that is heavily accessed. An example would be a directory or VTOC file. Accesses could be seconds, minutes, or even hours apart. |
| Systematic: | A file opened & accessed as a consequence of other files being used. |
| Periodic: | A file that is used on a predictable schedule such as daily, weekly, monthly, 1st of month, 15th of month, etc. |
| Occasional: | A file whose usage in time cannot be predicted or classified by the above criteria. |
| Transient: | A file created and deleted in a short time interval. A scratch file not intended for any future use. |

SUMMARY

The foregoing objects have been achieved in a computer system including a host computer connected to access a plurality of data storage units and including an operating system having tables of file locations of data on the data storage units, by the improvement of the present invention comprising, a data storage unit access controller connected between the host computer and the plurality of data storage units for receiving read and write requests from the host computer, for reading and writing data from and to the plurality of data storage units, and for transferring data to and from the host computer; a communications link connected between the data storage unit access controller and a console privilege interface of the host computer operating system for obtaining and providing the data storage unit access controller with data file location information contained within the tables; and, computational logic contained in the data storage unit access controller for using the communications link to obtain file location information about a data request from the host computer whereby the operating system continues to operate with respect to providing transparency about data locations to user programs operating within the host computer.

In the preferred embodiment, the computational logic includes learning logic so that once the location of a requested data on the plurality of data storage units has been obtained using the communications link, it is known and remembered by the computational logic.

In a computer system wherein the computer system includes near line archival storage apparatus of an automated variety wherein off-line storage media are loaded for reading and writing on request by robotic mechanisms so as to avoid the necessity of operator intervention, the preferred embodiment includes the computational logic including logic for using the communications link to obtain location information about files on the near line archival storage apparatus. As a further feature of the preferred embodiment, the computational logic includes learning logic so that once the location of a requested file on the near line archival storage apparatus has been obtained using the communications link, it is known and remembered by the computational logic. Also, the learning logic of the computational logic is of an artificial intelligence variety which learns through experience so that if a particular file from the near line archival storage apparatus is repeatedly used at a given time and day of the month the learning logic learns that from experience and begin loading the file from the near line archival storage apparatus in anticipation of an expected request so that when the request is made, the file is already read in and available for use. Such files are handled in such a manner by computational logic to appear to the user CPU as a virtual array.

The near line archival storage apparatus is managed in such a way by the computational logic that it virtually extends the maximum capacity of the physical array disc drives to include the capacity of the entire archive storage apparatus thus creating the appearance of a disc drive of boundless capacity without degrading performance.

In addition this solves the aforesaid backup problems related to file maintenance, management and archival copy.

Preferably, the computational logic means also includes testing logic for testing the plurality of data storage units in a background mode on a time-available basis.

The preferred data storage unit access controller comprises, a plurality of data storage unit controller channels connected to respective ones of the plurality of data storage units for controlling transfers of data to and from an associated one of the plurality of data storage units in response to received high level commands. Each of the plurality of data storage unit controller channels includes a cache/buffer memory and a microprocessor unit for controlling the transfers of data and status; an interface and driver unit for interfacing with the communications link and the host computer; a central cache memory; cache memory controller for controlling transfers of data from the cache/buffer memory of the plurality of data storage unit controller channels to the cache memory and from the cache memory to the cache/buffer memory of the plurality of data storage unit controller channels and from the cache memory to the host computer through the interface and driver unit; at least one central processing unit for managing the use of the cache memory by requesting data transfers only with respect to ones of the plurality of data storage units where data associated therewith is not presently in the cache memory and for sending high level commands to the plurality of data storage unit controller channels to effect data transfers thereby; a first (data) bus interconnecting the plurality of data storage unit controller cache/buffer memories, the interface and driver unit cache/buffer memory, and the cache memory for the transfer of information therebetween; and, a second (information and commands) bus interconnecting the plurality of data storage unit controller channels, the interface and driver unit, the cache memory controller, and the central processing unit for the transfer of control and information therebetween. The preferred data storage unit access controller includes, an alphanumeric display; and, a driver circuit for driving the display.

The preferred interface and driver unit comprises, first bus drivers for connecting to and interfacing with the first bus; host computer interface drivers for connecting to and interfacing with the host computer; a communications link interface for connecting to and interfacing with the communications link; a first unidirectional FIFO connected between the first bus drivers and the host computer interface drivers for receiving inputs from the first bus intended for the host computer; a second unidirectional FIFO connected between the host computer interface drivers and the first bus drivers for receiving inputs from the host computer intended for the first bus; at least one local micro-processor for controlling the first unidirectional FIFO, the second unidirectional FIFO, and the host computer interface drivers; and, connector means for connecting the at least one local micro-processor to the second bus.

In the preferred embodiment, each of the plurality of data storage unit controller channels comprises, first bus drivers for connecting to and interfacing with the first bus; data storage unit interface drivers for connecting to and interfacing with an associated one of the plurality of data storage units; a cache data buffer; data semaphore logic for preventing simultaneous access to the data buffer by the first bus drivers and the data storage unit interface drivers; a buffer address register for providing a current active address into the data buffer; at least one local micro-processor for controlling the data semaphore logic and the data storage unit interface drivers; and, connector means for connecting the at least one local micro-processor to the second bus.

FIG. 1(h) demonstrates the performance potential of the present invention as well as the increasing gap between CPU and storage I/O performance with prior art.

DESCRIPTION OF THE DRAWINGS

FIG. 6 is a simplified drawing employed for an example to show the dual asynchronous operation of the present invention.

DESCRIPTION OF THE PREFERRED EMBODIMENT

Figure 1D:
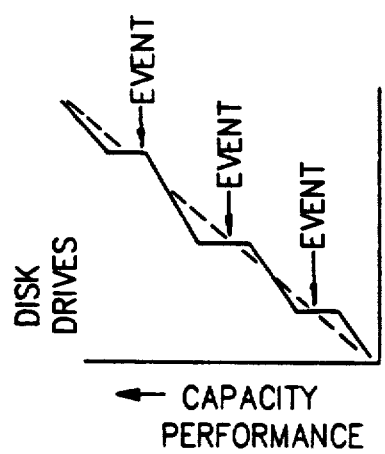
FIG. 1(a) to (h) show the historical performance of computer systems.
Figure 1C:
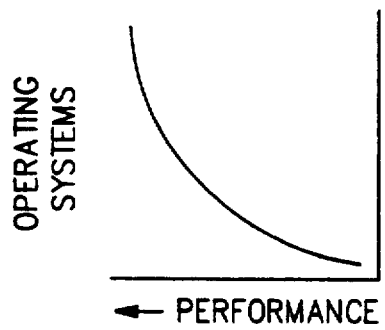
Figure 1B:
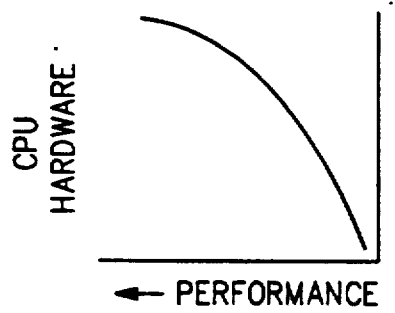
Figure 1A:
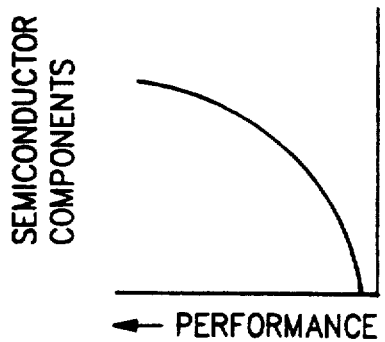
Figure 1H:
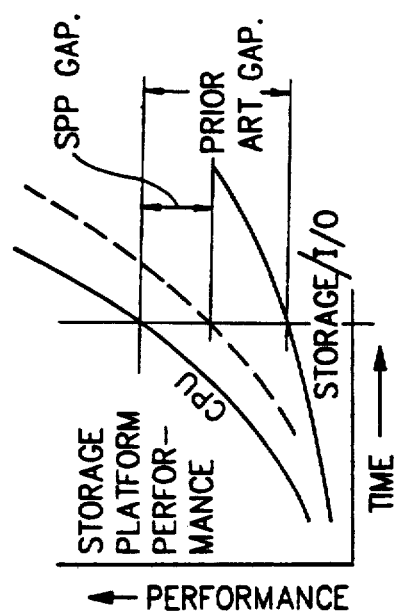
Figure 1G:
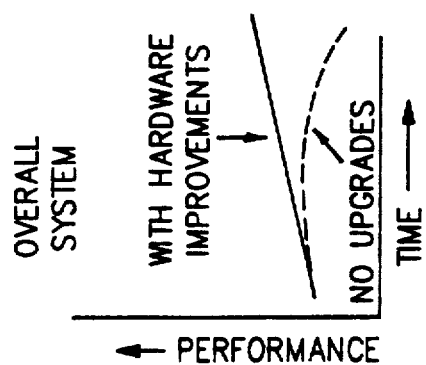
Figure 1F:
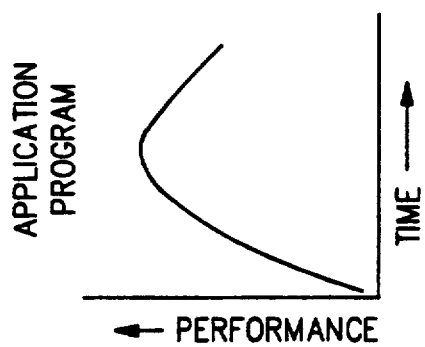
Figure 1E:
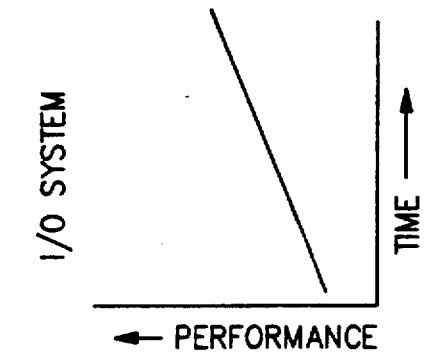
Figure 1I:
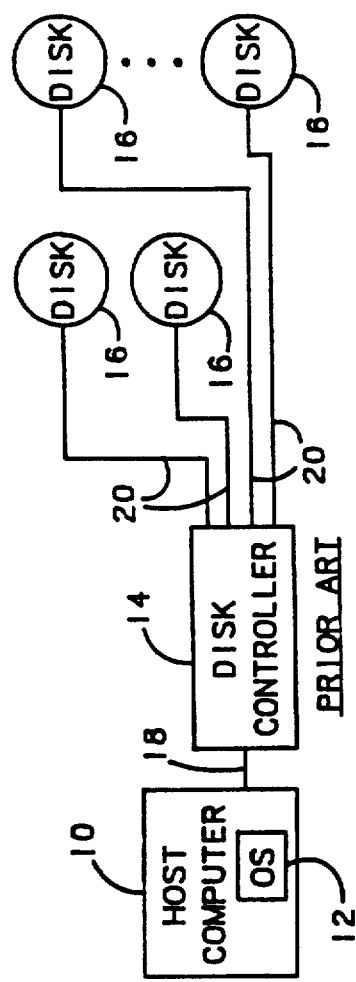
FIG. 1(i) is a simplified block diagram of a prior art approach to a disk-based memory system, and the performance potential of the present invention is shown in FIG. 1(h).
Figure 2:
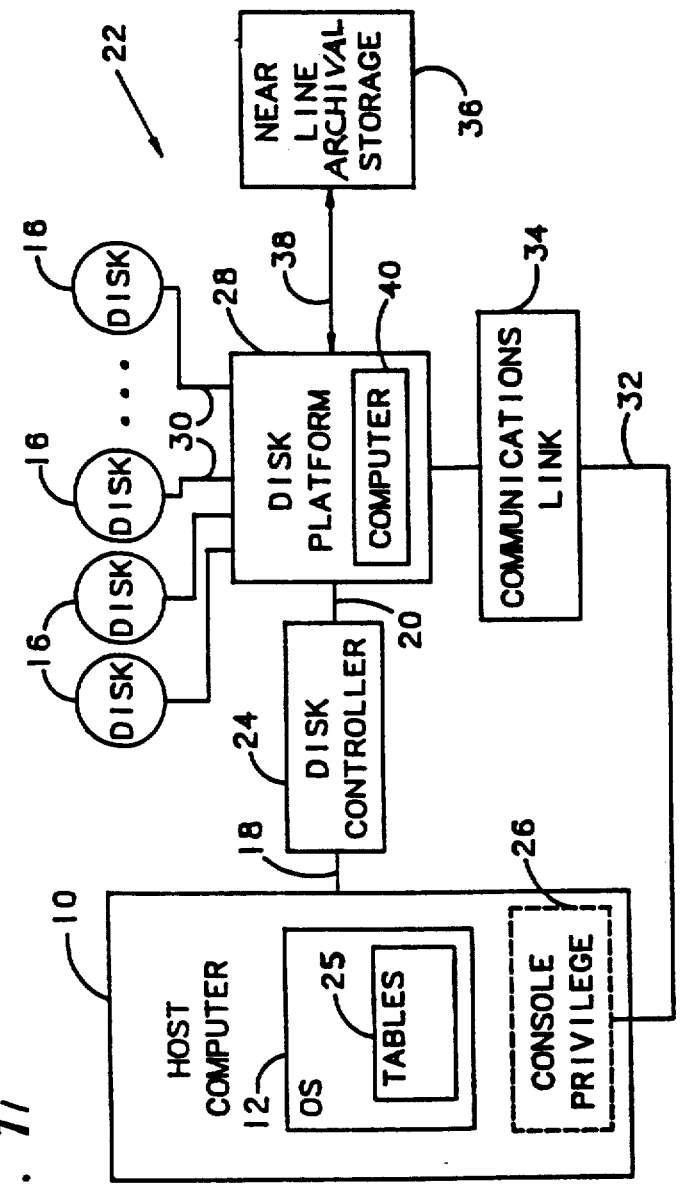
FIG. 2 is a simplified block diagram of a platform-based disk memory system according to the present invention.

An improved overall computer system according to the present invention employing both disk and near line archival storage is shown in FIG. 2 where it is generally indicated as 22. The system 22 has a host computer 10 containing an operating system 12 with its tables 25. There is also a console privilege interface 26 by means of which outside user consoles (not shown) can be used to access the host computer operating system 12. There is once again a disk controller 24 since there is no change to the operating system 12 and the operating system 12 is set up to interface with the disk controller 24. Rather than being connected directly to the disk drives 16 as in the prior art approach of FIG. 1(i), however, the single line 20 from the disk controller 24 is connected to an intelligent disk platform 28. The disk platform 28 is then connected to interface with the disk drives 16 through lines 30. Additionally, the disk platform 28 has a bi-directional connection 32 through a communications link 34 to the console privilege interface 26. In the preferred embodiment as applicable for large-scale storage systems, there is also near line archival storage apparatus 36 connected to the disk platform 28 through line 38. To perform within the system 22 of this invention, the near line storage apparatus 36 should be of an automated variety selected from any of a number well known in the art where off-line storage media are loaded for reading and writing on request by automated mechanisms so as to avoid the necessity of operator intervention To accomplish its unique improvements over the prior art, the disk platform 28 includes its own computing capability as represented by the computer block 40. As will be seen shortly, the computer 40 may, in fact, comprise multiple processing units; but, for the present it is sufficient to note that the disk platform 28 is not the "dumb" controller 14 of the prior art. Employing the bi-directional connection 32 through the communications link 34 to the console privilege interface 26, the computer 40 can find the location of data from the tables 25 of the operating system 12. The location of data within the disk drives 16 or the near line archival storage apparatus 36 is, therefore, transparent to both the operating system 12 and the applications programs requesting it. If requested data is located on the near line archival storage apparatus 36, it can be retrieved automatically and then be relayed to the operating system 12 just as if it was on one of the disk drives 16. More importantly, the preferred computer 40 is of the self learning variety which learns through experience Thus, for example, if a particular file from the near line archival storage apparatus 36 is used at a given time and/or day each month (as in preparing a payroll), the logic of the computer 40 will learn that from experience and begin loading the file from the near line storage apparatus 36 in anticipation of the expected request so that when the request is made, the file is already read in and available for use. Thus, the overall system performance of the system 22 is not only improved over the prior art for a given level of file location transparency to the users; but, additionally, the overhead drops as the system learns the repeated patterns of use associated with its users. In addition, whereas the prior art approach of FIG. 1(i) could only do system and equipment diagnostics by taking the computer 10 off-line or by increasing the complexity and overhead of the operating system 12 once again by having the operating system 12 perform such functions in a background mode, the storage system and equipment diagnostics are now performed by the computer 40 located within the disk platform 28 on a continuing and time-available basis. As will be seen from the description which follows, when the disk drives 16 have a fault or error, any errors and problems found can be corrected or at least pin pointed for operator correction and replacement without taking the system 22 off line or causing any significant degrading of the performance thereof.

Figure 3:
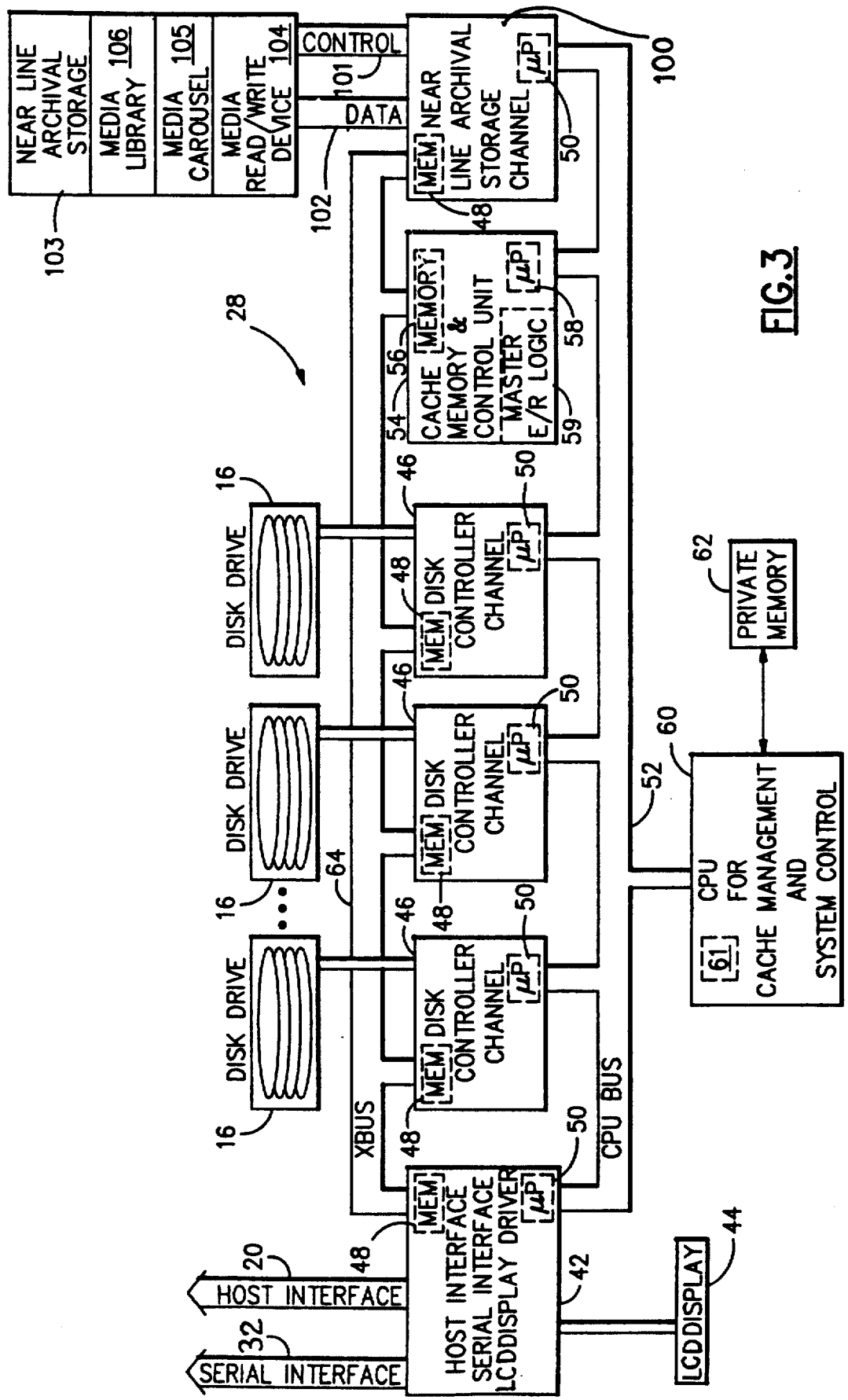
FIG. 3 is a simplified block diagram of the disk memory platform of the system of FIG. 2.

Having thus described a preferred overall system approach to storage systems according to the present invention, attention will now be turned to a preferred construction of the disk platform 28. As reference to the above-referenced parent application of this application will reveal, the essence of that invention was the asynchronous accessing of the various disk drives 16. That system employed individual disk channel controllers for respective ones of the disk drives 16 and each of the disk channel controllers included a cache/buffer memory. All the disk channel controllers were controlled by control signals from a common control computer and both data and the control signals employed the same bus. As depicted in FIG. 3, the preferred disk platform 28 of this disclosure has been restructured to greatly improve the performance while, at the same time, also substantially reducing the complexity whereby the reliability is increased and the implementation thereof is greatly simplified with attendant known benefits.

In FIG. 3, line 18 is labelled as the "SERIAL INTERFACE" and line 20 is labelled as the "HOST INTERFACE". In a tested embodiment, the SERIAL INTERFACE of line 18 is an RS-232 interface and the HOST INTERFACE of line 20 is a SCSI (small computer system interface) interface. This choice was as a result of the availability of commonly-used equipment for use in testing only and those skilled in the art will readily recognize and appreciate that the same techniques being described here by way of example could be accomplished employing other hardware interface methods and apparatus known in the art, or yet to be developed. In this regard, the improvements of this invention are both universal and adaptable. The two lines are connected to a interface and driver unit 42 which provides the host interface, serial interface, and LCD display driver functions as indicated therein. The logic and apparatus of interface and driver unit 42 is also connected to a display 44. The display 44 is not an absolute requirement; but, is preferred so that messages can be provided to an operator as, for example, in the event of a detected malfunctioning disk drive 16 which has been removed from operation and should be replaced in order to restore full system capability.

There are a plurality of disk controller channels 46 connected to respective ones of a plurality of disk drives 16. At this point, it is reasonably anticipated that up to twenty-three disk drives 16 can be supported by the disk platform 28. It is preferred for error detection and correction optimization that at least one extra disk controller channel 46 and associated disk drive 16 be up and running at all times to be used as a "hot" replacement in the event of a detected error or potential problem. While it will be remembered from the parent case that apparatus according to the general approach of which this is an improvement can continue to operate with detected errors by correcting them on the fly, such dynamic correcting will degrade the performance of the system. Thus, it is preferable to dynamically substitute a disk channel and let the problem channel be fixed by service personnel off-line. When repaired, that channel can then become the hot replacement. Each of the disk controller channels 46 again has a cache/buffer memory 48 associated therewith. Where the memory of the disk controller channels of the parent case performed the dual function of a memory buffer into which to read and from which to write with respect to the disk drive connected thereto and a cache memory, the memories 48 of this invention in general perform the buffer function It is preferred that the memories 48 be sized to be involved in more than one transfer at a time so that at least one stream of data can be read into the memory 48 while another stream of data is being written out of the memory 48. Another important distinction between the approach of this invention and that of the parent application is the inclusion of a micro-processor 50. As will be remembered, the disk controller channels of the parent case were dumb; that is, they did not include any computing power. Thus, the disk controller channels of the parent case had to be fed a stream of low level commands, resulting in a large amount of non-data traffic sharing the bus with the data. That, of course, reduced the overall throughput of data along the bus. In the "intelligent" disk controller channels 46 of this approach, the disk controller channels 46 are provided only with high level command signals and accomplish the balance of the indicated read and write functions internally with the micro-processors 50. Thus, the amount of non-data traffic on the CPU bus 52 is greatly reduced, allowing more available time for the transfer of data—which, of course, should be the primary function thereof for optimum system performance.

A significant element of this application is the cache memory & control unit 54. While the memories 48 of the disk controller channels 46 in the tested embodiment are each 8K bytes in size, the cache memory 56 of the cache memory & control unit 54 is 16M bytes. The cache memory & control unit 54 also includes its own microprocessor 58 and master error recovery logic 59.

Finally, the preferred disk platform 28 includes a central processing unit (CPU) 60 with its own private memory 62. The CPU 60 is employed for cache management and system control functions in a manner to be described shortly. As shown in FIG. 3, the above-described components with the exception of the CPU 60 are interconnected to communicate with one another by the XBUS 64 and interconnected to communicate with the CPU 60 by means of the CPU bus 52.

As mentioned above, the main point of novelty of the parent case was that data was transferred to and from the various disk drives asynchronously In this invention, there are two layers of asynchronous operation— which greatly enhances the overall system performance. Not only is the transfer of data between the memories 48 and the disk drives 16 done asynchronously as in the prior disclosure; but, additionally, transfers into and out of the cache memory 56 is done asynchronously. Because of its size (i.e. 16M bytes) the cache memory 56 can be employed for the transfer of multiple requests from the host computer 10 at one time. Because of access times of the disk drives 16, lengths of transfers requested, and/or data portions already in the cache memory 56, the requests to read and write data from the CPU 60 to the disk platform 28 may not be responded to in the order received. As soon as a request is completed, no matter its position in the request sequence, the CPU 60 is informed that it is completed. Thus, throughput as seen by the host computer 10 is greatly improved The CPU 60 includes an embedded array disk operating system 61 and employs its private memory 62 to keep track of the contents of the cache memory 56 so that it can respond optimally to requests from the host computer 10. As stated earlier, the CPU 60 in this system only issues high level commands to the disk controller channels 46 so that the multiple, low-level command approach of the parent case, which occupied valuable time on the CPU bus 66, is eliminated. The micro-processors 50 each contain firmware that not only performs the actual low-level command steps required to do disk transfers; but, in addition, performs continuing self-testing of the individual controller channel on a time-available basis to assure that the components are continuing to work properly. Should such self-check indicate a potential problem, the CPU 60 then conducts further testing of the subject disk controller channel 46 to see if an on-line "hot" spare disk drive 16 or disk controller channel 46 should be employed while the malfunctioning unit is flagged for work on the display 44 and removed from use temporarily.

By putting the CPU 60, by way of micro-processor 58, in complete charge of transfers between the memories 48 and the cache memory 56 the problem of dealing with bus arbitration on the XBUS 64 is also eliminated. That, of course, has many beneficial effects such as increased reliability, increased throughput, and simplicity of implementation.

Figure 4:
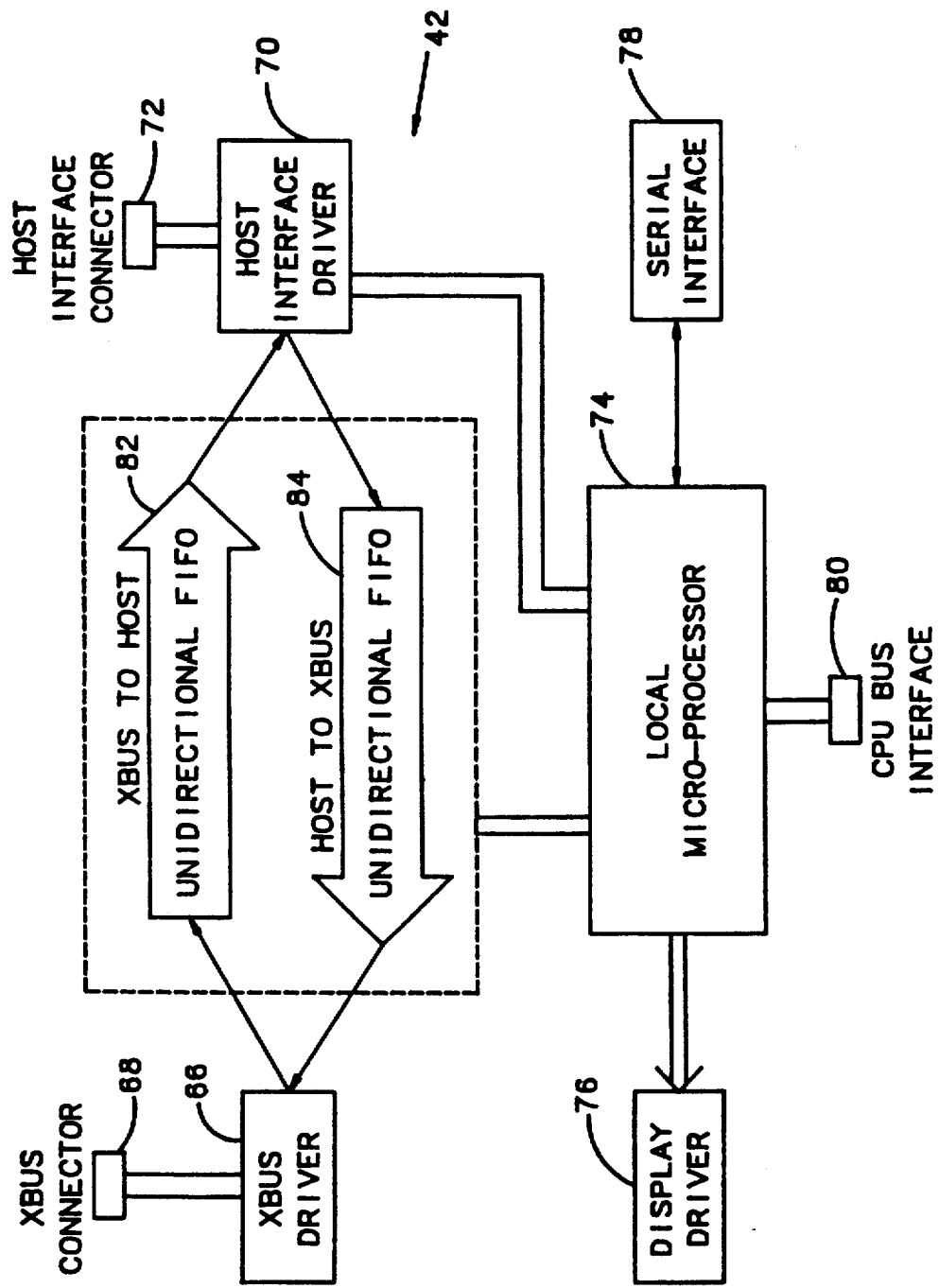
FIG. 4 is a simplified block diagram of the host interface block of the disk memory platform of FIG. 3.
Figure 5:
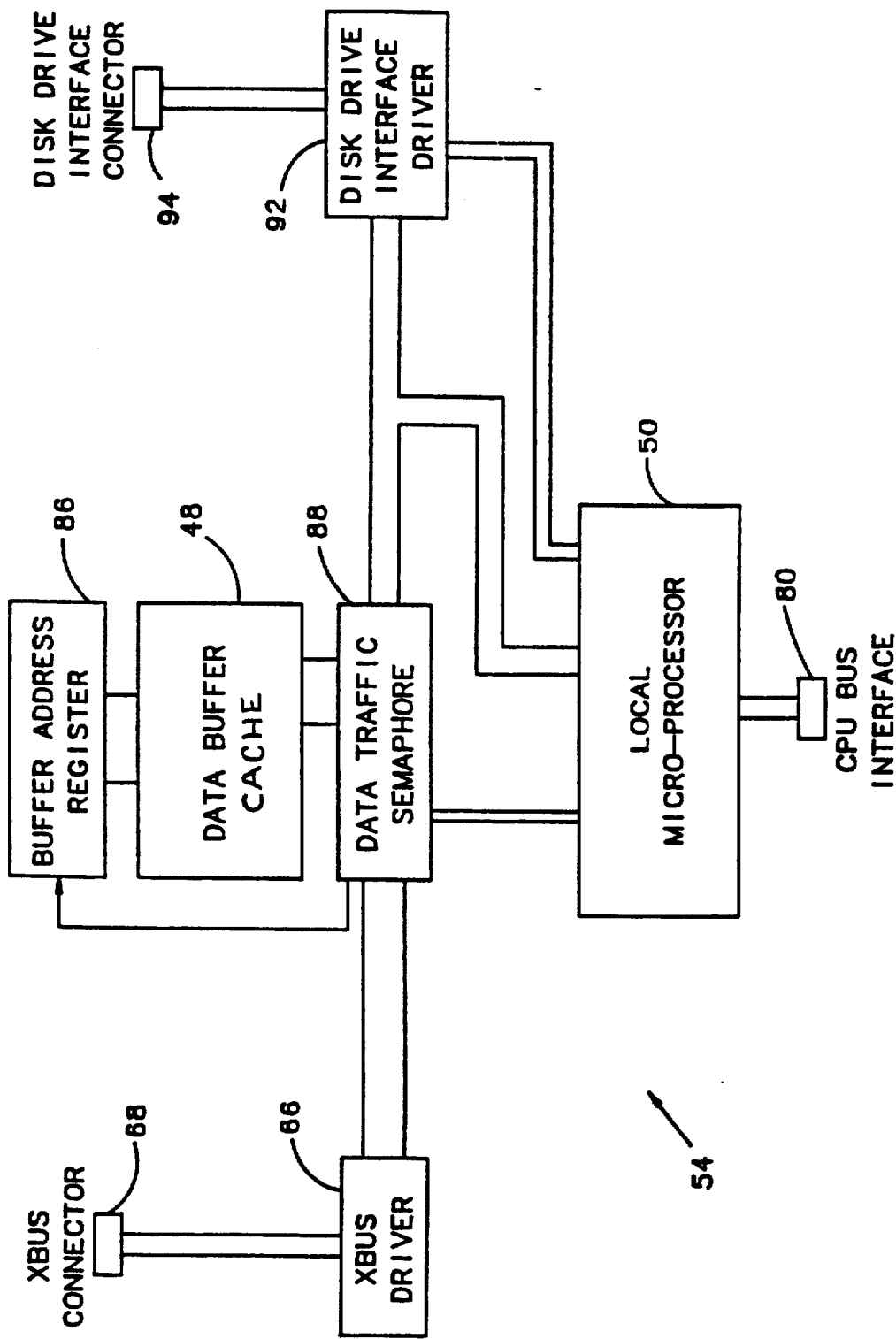
FIG. 5 is a simplified block diagram of the one of the disk controller channels of the disk memory platform of FIG. 3.

To get a better idea of the operation of the disk platform 28 of this invention, we will now turn to FIGS. 4 and 5 with particularity. FIG. 4 shows further details of the interface and driver unit generally labelled as 42 while FIG. 5 shows further details of one of the disk controller channels 46. With reference first to FIG. 4, there is an XBUS driver 66 connected to the XBUS 64 with a connector 68. There is also a host interface driver 70 (SCSI in the tested embodiment) connected into line 20 back to the host computer 10 by a connector 72. As with the other elements, there is also a local microprocessor 74 to control the operation of the elements of the interface and driver unit 42. The micro-processor 74 interfaces with a display driver 76 (which is connected to the display 44) and a serial interface driver 78 of FIG. 4 (which is connected to the serial interface on line 18). All the driver elements are well known to those skilled in the art and will be chosen according to the type of device with which they must interface. The microprocessor 74 is also connected to the CPU bus 52 with connector 80. The heart of the interface and driver unit 42 and most important part thereof is a pair of unidirectional FIFOs 82 and 84. Under the control of the local micro-processor 74, FIFO 82 receives and transmits data from the XBUS 66 to the host computer 10. Similarly, FIFO 84 receives and transmits requests and data from the host computer 10 to the XBUS 66. Thus, bi-directional transmissions can take place between the XBUS 66 and the host computer 10. This is another feature of this embodiment which improves the overall throughput of the system 22.

The disk controller channels 46 depicted in FIG. 5 also includes an XBUS driver 66 and a disk drive interface driver 92 connected to the associated disk drive 16 with their associated connectors 68, 94. Similarly, the local micro-processor 50 is connected to the CPU bus 52 with a connector 80. In addition to the data buffer memory 48, there is a buffer address register 86 of FIG. 5 which controls the locations in the memory 48 which are accessed and a data traffic semaphore 88 which operates in a manner readily apparent to those skilled in the art to control access to and from the memory 48 under the control of the micro-processor 58. Thus, it is the data traffic semaphore 88 which actually inserts the addresses into the buffer address register 86. The data traffic semaphore 88 must be present to prevent simultaneous access to the memory 48 by both the XBUS 64 (and elements connected therethrough) and the host computer 10. Such devices are well known and employed in the computing art for that purpose as any attempt to simultaneously read from and write into a memory location can cause irreversible errors.

The near line archival storage channel 100 of FIG. 3 is controlled in the same manner as disk controller channel 46 thru microprocessor 50 and cache/buffer memory 48 and contains the logic to control by way of control bus 101 the near line archival storage 103 and its individual elements 104, 105 and 106 to read and write data by way of data bus 102. Data read from near line archival storage 103 is held in cache memory 56 or on disk drives 16 and is accessed by the host computer with sector numbers beyond the physical limits of disk drives 16 creating a virtually boundless storage capacity.

Having thus described the construction and operation of the system 22 in general, a more specific example of its unique mode of operation will now be described with reference to FIG. 6. For simplicity, FIG. 6 depicts in simplified form only the cache/buffer memories 48 in the channels and the cache memory 56 as connected by the XBUS 64. Assume that a request has been made by the host computer 10 to read data. The disk platform 28, of course, knows (or can determine) the location of the data in the disk drives 16 through its above-described access to the tables 25 in the host computer 10. According to the fault tolerant techniques described in the parent application, the data (and its parity bits) are spread across the disk drives 16. From the contents of its private memory 62, the logic in the CPU 60 knows the present contents of the cache memory 56. Anything that is already in the cache memory 56 will not be reread, of course, which is the usual function of any cache memory (i.e. to eliminate redundant and unnecessary disk accesses). The CPU 60 then issues high level requests to the various disk controller channels 46 to have them retrieve the elements of the data from their locations on the disk drives. The requests also go to the cache memory & control unit 54 so that it knows what is going on. From there on, the collection of the data and its transfer to the host computer 10 is under the control of the micro-processor 58 in the cache memory & control unit 54. The micro-processor 58 assigns available buffer space (as indicated by the dashed box 90 of FIG. 6) in which to receive the data of the request. The data segments are asynchronously brought into the buffer memories 48 under the control of the microprocessors 50 as a function of the originally-issued high level commands from the CPU 60. As the data segments are received, the micro-processor 58 is advised by the micro-processors 50 over the XBUS 64. The microprocessor 58 then asynchronously transfers the data segments into their appropriate location within the assigned buffer space 90. When the entire data of the request is in the assigned buffer space 90, the microprocessor 58 transfers it to the host computer 10 through the FIFO 82 described above. A write operation, of course, operated in much the same manner, except that data flow is in the opposite direction.

While only shown in simplified representation in FIG. 6, it may be appreciated therefrom and from a consideration of the elements and their method of operation as described above that the single cache memory 56 of substantial size as employed in this embodiment effect a vast improvement in simplicity and efficiency of operation (i.e. speed) Because of its size, the cache memory 56 will actually self-optimize the data it retains in cache over time so as to minimize the number of data transfers required with the disk drives. In this regard, it is important to recognize that the parity bits associated with data are contained in separately transferrable locations on the disk drives 16. Thus, over the course of time the most used data and their parity bits will be virtually permanent residents of the cache memory 56 and will only be written to the disk drives 16 for back-up purposes on a time-available basis in a background mode by the micro-processor 58. The impact of this on the overall performance of the system 22 should not be overlooked or minimized. Consider, if there are eight disk drives 16 containing the individual data bits of data and a ninth disk drive 16 containing the parity bits associated therewith, if the parity bits are contained in an unused portion of the cache memory 56 and only written to the ninth disk drive 16 when the eight disk drives 16 are not otherwise involved in an actual data transfer, disk access time to access data is reduced by one-ninth or eleven per-cent. The savings in time could be even more substantial in an instance where one of the eight disk drives 16 containing the data bits is malfunctioning and the parity bits are required to correct any errors in the data stream.

Thus, it can be seen from the foregoing description that the embodiments described herein provide substantial and novel improvements to the basic computer storage system of the parent application of which this is a continuation-in-part.

As with the parent application, those skilled in the art will readily recognize and appreciate that the use of disk drives as employed hereinbefore by way of example is a convenience only and that the techniques described herein could be, and are, applicable to other storage devices presently available or under development such as, for example, CD-ROMs. It is the inventors' intent and hope that the breadth accorded the inventions described in this application and the claims appended hereto be in keeping with the scope and spirit of the invention and not be limited in any way because of the use of the term disk drive in the specification and/or claims.

Wherefore, having thus described our invention, what is claimed is:

1. In a computer system including a host computer (10) connected to access a plurality of data storage units (16,36) and including an operating system (12) having tables of file locations (25) of data stored on said data storage units, the improvement comprising:
    a) data storage unit access control means (28) connected between the host computer (10) and the plurality of data storage units (16,36), for receiving read and write requests from the host computer, said read and write requests including data file manipulation commands and associated data file storage locations, for reading and writing data from and to the plurality of data storage units, and for transferring data to and from the host computer;
    b) host computer link means (18,24,20), connected between said data storage access control means (28) and said host computer (10), for establishing a first read and write request data path between said host computer and said data storage access control means, for providing said data storage access control means (28) with said read and write requests from said host computer (10), and for transferring data to and from said host computer (10);
    c) host computer operating system communications link means (34,32), connected between said data storage unit access control means (28) and a console privilege interface (26) to the host computer operating system (12), for establishing a second read and write request data path between said host computer and said data storage access control means, for obtaining and providing said data storage unit access control means (28) with data file manipulation commands from said operating system (12) and associated data file storage locations from said operating system tables of file locations (25) of data stored on said data storage units (16,36), said data file manipulation commands for directing said data storage units to manipulate predetermined data stored in said data file storage locations associated with said data file manipulation commands; and,
    d) computational logic means (40) contained in said data storage unit access control means (28) and responsive to at least said data file manipulation commands and associated data file storage locations received over said host computer operating system communications link means (34,32), for providing data storage unit command signals directing said data storage units to manipulate said predetermined data stored in said data file storage locations associated with said data file manipulation commands asynchronously with and independent of said read and write requests from said host computer over said first read and write request data path established by said host computer link means (18,24,20), whereby the host operating system provides transparency about data file manipulation commands to user programs operating within the host computer and reading and writing data to and from the plurality of data storage units over said host computer link means (34,32).

2. The improvement to a computer system of claim 1 wherein:
    said computational logic means includes learning logic so that once the location of a requested data on the plurality of data storage units has been obtained using said communications link means, it is known and remembered.

3. The improvement to a computer system of claim 1 wherein:
    a) the computer system includes near line archival storage apparatus of an automated variety wherein off-line storage media are loaded for reading and writing on request by automated mechanisms; and,
    b) said computational logic means includes logic for using said communications link means to obtain file location information about data on said near line storage apparatus.

4. The improvement to a computer system of claim 3 wherein additionally:
    said computational logic means includes learning logic so that once the location of a requested data on said near line storage apparatus has been obtained using said communications link means, it is known and remembered.

5. The improvement to a computer system of claim 4 wherein additionally:

said learning logic of said computational logic means is of a self learning variety which learns through experience so that if a particular file from said near line storage apparatus is repeatedly used at a given time said learning logic learns that from experience and begin loading said file from said near line archival storage apparatus in anticipation of an expected request so that when said request is made, said file is already read in and available for use.

6. The improvement to a computer system of claim 1 wherein:

said computational logic means includes testing logic for testing the plurality of data storage units in a background mode on a time-available basis.

7. The improvement to a computer system of claim 1 wherein said data storage unit access control means comprises:

a) a plurality of data storage unit controller channel means connected to respective ones of the plurality of data storage units for controlling transfers of data to and from an associated one of the plurality of data storage units in response to received high level commands, each of said plurality of data storage unit controller channel means including a cache/buffer memory and a micro-processor unit for controlling said transfers of data and status;

b) interface and driver unit means for interfacing with said communications link means and the host computer;

c) a central cache memory;

d) cache memory control means for controlling transfers of data from said cache/buffer memory of said plurality of data storage unit controller channel means to said cache memory and from said cache memory to said cache/buffer memory of said plurality of data storage unit controller channel means and from said cache memory to the host computer through said interface and driver unit means;

e) central processing unit means for managing the use of said cache memory by requesting data transfers only with respect to ones of the plurality of data storage units where data associated therewith is not presently in said cache memory and for sending high level commands to said plurality of data storage unit controller channel means to effect data transfers thereby;

f) first (data) bus means interconnecting said plurality of data storage unit controller cache/buffer memories, said interface and driver unit cache/buffer memory and said cache memory for the transfer of information therebetween; and, g) second (information and commands) bus means interconnecting said plurality of data storage unit controller channel means, said interface and driver unit means, said cache memory control means, and said central processing unit means for the transfer of control information therebetween.

8. The improvement to a computer system of claim 7 wherein said data storage unit access control means includes:

a) an alphanumeric display; and, b) driver means for driving said display.

9. The improvement to a computer system of claim 7 wherein said interface and driver unit means comprises:

a) first bus driver means for connecting to and interfacing with said first bus;

b) host computer interface driver means for connecting to and interfacing with the host computer;

c) communications link interface means for connecting to and interfacing with said communications link means;

d) a first unidirectional FIFO connected between said first bus driver means and said host computer interface driver means for receiving inputs from said first bus intended for the host computer;

e) a second unidirectional FIFO connected between said host computer interface driver means and said first bus driver means for receiving inputs from the host computer intended for said first bus;

f) local micro-processor means for controlling said first unidirectional FIFO, said second unidirectional FIFO, and said host computer interface driver means; and, g) connector means for connecting said local microprocessor means to said second bus.

10. The improvement to a computer system of claim 7 wherein each of said plurality of data storage unit controller channel means comprises:

a) first bus driver means for connecting to and interfacing with said first bus;

b) data storage unit interface driver means for connecting to and interfacing with an associated one of the plurality of data storage units;

c) a data buffer;

d) data semaphore means for preventing simultaneous access to said data buffer by said first bus driver means and said data storage unit interface driver means;

e) buffer address register means for providing a current active address into said data buffer;

f) local micro-processor means for controlling said data semaphore means and said data storage unit interface driver means; and, g) connector means for connecting said local microprocessor means to said second bus.

11. In a computer system including a host computer connected to access a plurality of disk drives to provide an asynchronously operating, improved disk drive access control apparatus connected between the host computer and the plurality of disk drives for receiving read and write requests from the host computer, for reading and writing data from and to the plurality of disk drives, and for transferring data to and from the host computer, said disk drive access control apparatus (28) comprising:

a) a plurality of disk drive controller channel means (48) connected to respective ones of the plurality of disk drives (16), for controlling transfers of data to and from an associated one of the plurality of disk drives in response to received high level commands, each of said plurality of disk drive controller channel means including a cache/buffer memory (48) and a micro-processor unit (50) for controlling said transfers of data;

b) interface and driver unit means (42), for interfacing with a host computer operating system communications link means (32,34) connected between said disk drive access control apparatus and a console privilege interface to a host computer operating system, said host computer operating system communications link means for establishing a second read and write request data path between said host computer and said interface and driver unit means, and for interfacing with a host computer link means connected between said disk drive access control apparatus and the host computer, said host computer link means for establishing a first read and write request data path between said host computer and said data storage access control means;

c) a central cache memory (56);

d) cache memory control means (54), for controlling transfers of data from said cache/buffer memory of said plurality of disk drive controller channel means to said cache memory and from said cache memory to said cache/buffer memory of said plurality of disk drive controller channel means and from said cache memory to the host computer through said interface and driver unit means;

e) central processing unit means (60) for managing the use of said cache memory (54) by requesting data transfers only with respect to ones of the plurality of disk drives where data associated therewith is not presently in said cache memory, for sending high level commands to said plurality of disk drive controller channel means to effect data transfers thereby, and for receiving over said host computer operating system communication link means (32,34), data file manipulation commands from said host computer operating system and associated data file storage locations from data storage unit file location tables maintained by said host computer operating system over said second read and write request data path, for providing data storage unit command signals controlling manipulation of predetermined data stored in said data file storage locations associated with said data file manipulation commands asynchronously with and independently of read and write requests received from said host computer over said first read and write request data path established by said host computer link means;

f) first (data) bus means interconnecting said plurality of data storage unit controller cache/buffer memories, said interface and driver unit means, said cache/buffer memory and said cache memory, for the transfer of information therebetween; and, g) second (information and commands) bus means interconnecting said plurality of data storage unit controller channel means, said interface and driver unit means, said cache memory control means, and said central processing unit means for the transfer of control information therebetween.

12. The improvement to a computer system of claim 11 wherein said disk drive access control means includes:

a) an alphanumeric display; and, b) driver means for driving said display.

13. The improvement to a computer system of claim 11 wherein said interface and driver unit means comprises:

a) first bus driver means for connecting to and interfacing with said first bus;

b) host computer link interface driver means, for connecting to and interfacing with the host computer;

c) host computer operating system communications link interface driver means, for connecting and interfacing with said host computer console privilege interface;

d) a first unidirectional FIFO connected between said first bus driver means and said host computer interface driver means, for receiving inputs from said first bus intended for the host computer;

e) a second unidirectional FIFO connected between said host computer interface driver means and said first bus driver means for receiving inputs from the host computer intended for said first bus;

f) local micro-processor means for controlling said first unidirectional FIFO, said second unidirectional FIFO, and said host computer interface driver means; and, g) connector means for connecting said local microprocessor means to said second bus.

14. The improvement to a computer system of claim 11 wherein each of said plurality of disk drive controller channel means comprises:

a) first bus driver means for connecting to and interfacing with said first bus;

b) disk drive interface driver means for connecting to and interfacing with an associated one of the plurality of disk drives;

c) a data buffer;

d) data semaphore means for preventing simultaneous access to said data buffer by said first bus driver means and said disk drive interface driver means;

e) buffer address register means for providing a current active address into said data buffer;

f) local micro-processor means for controlling said data semaphore means and said disk drive interface driver means; and, g) connector means for connecting said local microprocessor means to said second bus.

15. Disk driver access control apparatus for connection between a host computer (10) and a plurality of disk drives (16) to provide an asynchronously operating, storage system to receive read and write requests from the host computer, said read and write requests including data file manipulation commands and data file storage locations, for reading and writing data from and to the plurality of disk drives, and for transferring data to and from the host computer, said apparatus comprising:

a) a plurality of disk drive controller channels (48) connected to respective ones of the plurality of disk drives (16) and controlling transfers of data to and from an associated one of the plurality of disk drives in response to received high level commands, each of said plurality of disk drive controller channels including a cache/buffer memory (48) and a micro-processor unit (50) for controlling said transfers of data;

b) an interface and driver unit (42) interfacing with a host computer operating system communications link (32,34) connected between said disk drive control apparatus and a console privilege interface to a host computer operating system, and a host computer link connected between said disk drive access control apparatus and said host computer, said host computer link for establishing a first read and write request data path between said host computer and said data storage access control apparatus, said host computer operating system communications link for establishing a second read and write request data path between said host computer and said interface and driver unit;

c) a central cache memory (56);

d) cache memory control logic (54) controlling transfers of data from said cache/buffer memory of said plurality of disk drive controller channels to said cache memory and from said cache memory to said cache/buffer memory of said plurality of disk drive controller channels and from said cache memory to the host computer through said interface and driver unit;

e) a central processing unit (60) managing the use of said cache memory by requesting data transfers only with respect to ones of the plurality of disk drives where data associated therewith is not presently in said cache memory and by sending high level commands to said plurality of disk drive controller channels to effect data transfers thereby, and for receiving over said host computer operating system communication link (32,34), data file manipulation commands from said host computer operating system and associated data file storage locations from data storage unit file location tables maintained by said host computer operating system over said second read and write request data path, for providing data storage unit command signals controlling manipulation of predetermined data stored in said data file storage locations associated with said data file manipulation commands asynchronously with and independent of read and write requests from said host computer over said first read and write request data path established by said host computer link;

f) a first (data) bus interconnecting said plurality of data storage unit controller cache/buffer memories, said interface and driver unit cache/buffer memory and said cache memory for the transfer of information therebetween; and, g) second (information and commands) bus interconnecting said plurality of data storage unit controller channel means, said interface and driver unit, said cache memory control logic, and said central processing unit for the transfer of control information therebetween.

16. The disk drive access control apparatus of claim 15 wherein said disk drive access control logic includes:
a) an alphanumeric display; and,
b) driver means for driving said display.

17. The disk drive access control apparatus of claim 15 wherein said interface and driver unit comprises:
a) first bus driver means for connecting to and interfacing with said first bus;
b) host computer link interface driver means for connecting to and interfacing with the host computer;
c) host computer operating system communication link interface driver means, for connecting to and interfacing with said host computer operating system console privilege interface;
d) a first unidirectional FIFO connected between said first bus driver means and said host computer interface driver means for receiving inputs from said first bus intended for the host computer;
e) a second unidirectional FIFO connected between said host computer interface driver means and said first bus driver means for receiving inputs from the host computer intended for said first bus;
f) local micro-processor means for controlling said first unidirectional FIFO, said second unidirectional FIFO, and said host computer interface driver means; and,
g) connector means for connecting said local microprocessor means to said second bus.

18. A method of operating the disk drive access control apparatus of claim 17, wherein said apparatus performs the steps of:

a) controlling transfers of data from the cache/buffer memory of the plurality of disk drive controller channels to the cache memory and from the cache memory to the cache/buffer memory of the plurality of disk drive controller channels and from the cache memory to the host computer through the interface and driver unit; and, b) managing the use of the cache memory by requesting data transfers only with respect to ones of the plurality of disk drives where data associated therewith is not presently in the cache memory and sending high level commands to the plurality of disk drive controller channels to effect data transfers thereby.

19. The method of claim 18 wherein said apparatus additionally performs the step of:
employing a data semaphore to prevent simultaneous access to the data buffer by a first bus driver and a disk drive interface driver.

20. The method of claim 18 wherein said apparatus additionally performs the steps of:
a) saving a history of data accesses by the host computer;
b) anticipating data accesses from the history of data accesses and retrieving the data associated with the accesses from the disk drives before an actual request therefor is made by the host; and
c) managing the near line archival storage apparatus to create a virtual array, of accessible data including the capacity of the entire near line archival storage apparatus, with the appearance of a disk drive of boundless capacity.

21. The method of claim 18 where a computer system including the host computer and disk drives further includes near line storage apparatus of an automated variety wherein off-line storage media are loaded for reading and writing on request by automated mechanisms so as to avoid the necessity of operator intervention and wherein said apparatus additionally performs the steps of:
employing the host computer operating system communications link to obtain the location of data on the near line storage apparatus from the host computer operating system.

22. The method of claim 21 wherein said apparatus additionally performs the steps of:
a) saving a history of data accesses by the host computer;
b) anticipating data accesses from the history and retrieving the data associated with the accesses from the near line storage apparatus before an actual request therefor is made by the host computer; and
c) managing the near line archival storage apparatus to create a virtual array, of accessible data including the capacity of the entire near line archival storage apparatus, with the appearance of a disk drive of boundless capacity.

23. The disk drive access control apparatus of claim 15 wherein each of said plurality of disk drive controller channels comprises:
a) first bus driver means for connecting to and interfacing with said first bus;
b) disk drive interface driver means for connecting to and interfacing with an associated one of the plurality of disk drives;
c) a data buffer;

d) data semaphore means for preventing simultaneous access to said data buffer by said first bus driver means and said disk drive interface driver means;

e) buffer address register means for providing a current active address into said data buffer;

f) local micro-processor means for controlling said data semaphore means and said disk drive interface driver means; and, g) connector means for connecting said local micro-processor means to said second bus.

24. The disk drive access control apparatus of claim 15 and additionally comprising:

computational logic means for using said communications link means to obtain file location information about a data manipulation request from the host computer whereby whereby said host operating system provides transparency about said data file manipulation commands to user programs operating with the host computer and reading and writing data to and from the plurality of disk drives over said host computer link means.

25. The improvement to a computer system of claim 24 wherein:

said computational logic means includes testing logic for testing the plurality of disk drives in a background mode on a time-available basis.

26. The disk drive access control apparatus of claim 24 wherein:

said computational logic means includes learning logic so that once the location of a requested data on the plurality of disk drives has been obtained using said communications link means, it is known and remembered.

27. The disk drive access control apparatus of claim 24 wherein:

a) a computer system including the host computer and disk drives further includes near line archival storage apparatus of an automated variety wherein off-line storage media are loaded for reading and writing on request by automated mechanisms;

b) said computational logic means includes logic for using said communications link means to obtain location information about files on said near line archival storage apparatus; and c) said computational logic means managing the near line archival storage apparatus to create a virtual array, of accessible data including the capacity of the entire near line archival storage apparatus, with the appearance of a disk drive of boundless capacity.

28. The disk drive access control apparatus of claim 27 wherein additionally:

said computational logic means includes learning logic so that once the location of a requested data on said near line storage apparatus has been obtained using said communications link means, it is known and remembered.

29. The disk drive access control apparatus of claim 28 wherein additionally:

said learning logic of said computational logic means is of a self learning variety which learns through experience so that if a particular file from said near line storage apparatus is repeatedly used at a given time said learning logic learns that from experience and begin loading said file from said near line storage apparatus in anticipation of an expected request so that when said request is made, said file is already read in and available for use.

* * * * *